(12) United States Patent
Takada

(10) Patent No.: US 11,415,117 B2
(45) Date of Patent: Aug. 16, 2022

(54) TORQUE CONVERSION DEVICE

(71) Applicant: Tomoaki Takada, Nagano (JP)

(72) Inventor: Tomoaki Takada, Nagano (JP)

(*) Notice: Subject to any disclaimer, the term of this patent is extended or adjusted under 35 U.S.C. 154(b) by 0 days.

(21) Appl. No.: 17/282,429

(22) PCT Filed: Oct. 4, 2019

(86) PCT No.: PCT/JP2019/039286
§ 371 (c)(1),
(2) Date: Apr. 2, 2021

(87) PCT Pub. No.: WO2020/071533
PCT Pub. Date: Apr. 9, 2020

(65) Prior Publication Data
US 2021/0388823 A1    Dec. 16, 2021

(30) Foreign Application Priority Data
Oct. 5, 2018 (JP) ............................. JP2018-189736

(51) Int. Cl.
*F03G 3/00* (2006.01)
*F03G 7/10* (2006.01)

(52) U.S. Cl.
CPC .................................. *F03G 7/115* (2021.08)

(58) Field of Classification Search
CPC .............. F03G 3/00; F03G 7/115; F16H 33/20
See application file for complete search history.

(56) References Cited

U.S. PATENT DOCUMENTS

| 3,584,515 A | * | 6/1971 | Matyas ..................... F03G 3/00 74/84 S |
| 3,979,961 A | * | 9/1976 | Schnur .................... F16H 43/00 74/61 |
| 4,241,615 A | * | 12/1980 | Ryan ....................... B06B 1/167 74/61 |
| 5,123,292 A | * | 6/1992 | Woltering ............... F16H 33/20 74/61 |
| 5,172,599 A | * | 12/1992 | Woltering ................ B07B 1/42 74/61 |
| 5,388,469 A | * | 2/1995 | Woltering ............... F16H 33/20 74/61 |

(Continued)

FOREIGN PATENT DOCUMENTS

| JP | 44-19486 B1 | 8/1969 |
| JP | 30982/1976 | 8/1974 |
| JP | 11-173255 | 6/1999 |

*Primary Examiner* — David M Fenstermacher
(74) *Attorney, Agent, or Firm* — Cozen O'Connor

(57) ABSTRACT

A torque conversion device has: a second rotor having a second rotating shaft parallel to a first rotating shaft of a first rotor; link portions having first mounting portions attached to the first rotor, and second mounting portions attached to the second rotor, the link portions interposed between first rotor and second rotor; and weights mounted to the link portions and located on either side of the first mounting portions. The distance between first mounting portions and second mounting portions is equal to the distance between first rotating shaft and second rotating shaft, and the distance between first rotating shaft and first mounting portions is equal to the distance between the second rotating shaft and the second mounting portions.

7 Claims, 15 Drawing Sheets

(56) References Cited

U.S. PATENT DOCUMENTS

| | | | | |
|---|---|---|---|---|
| 6,044,718 | A * | 4/2000 | Lester | F16H 33/08 |
| | | | | 475/14 |
| 6,694,844 | B2 * | 2/2004 | Love | F03G 7/10 |
| | | | | 74/DIG. 9 |
| 7,832,297 | B2 * | 11/2010 | Hewatt | G01C 19/02 |
| | | | | 74/5.37 |
| 2004/0069080 | A1 * | 4/2004 | Sordjan, Jr. | F16H 33/20 |
| | | | | 74/84 S |
| 2004/0103729 | A1 * | 6/2004 | Strickler | F16H 33/08 |
| | | | | 74/84 S |
| 2010/0186527 | A1 * | 7/2010 | Silver | F03H 99/00 |
| | | | | 74/64 |
| 2021/0364071 | A1 * | 11/2021 | Mostovoy | F03G 7/125 |

* cited by examiner

Fig. 13

| WEIGHT mo(kg) | 6 | 30 | 90 |
|---|---|---|---|
| TORQUE (Nm) | 2561.93 | 17114 | 30068.24 |
| RPM | OUTPUT (kW) | | |
| 10 | 2.68 | 4.81 | 15.14 |
| 20 | 5.37 | 9.52 | 30.28 |
| 30 | 8.05 | 14.42 | 45.42 |
| 40 | 10.73 | 19.23 | 60.56 |
| 50 | 13.41 | 24.04 | 75.70 |
| 60 | 16.10 | 28.85 | 90.84 |
| 70 | 18.78 | 33.66 | 105.98 |
| 80 | 21.46 | 38.47 | 121.12 |
| 90 | 24.15 | 43.27 | 136.26 |
| 100 | 26.83 | 49.08 | 151.40 |
| 110 | 29.51 | 52.89 | 166.53 |
| 120 | 32.19 | 57.70 | 181.67 |
| 240 | 64.39 | 115.40 | 363.35 |
| 360 | 96.58 | 173.09 | 545.02 |

TORQUE CONVERSION DEVICE

CROSS REFERENCE TO RELATED APPLICATION

This is a U.S. national stage of application No. PCT/JP2019/039286, filed on Oct. 4, 2019. Priority is claimed on Japanese Patent Application No. 2018-189736 filed Oct. 5, 2018, the content of which is incorporated herein by reference.

TECHNICAL FIELD

The present invention relates to torque conversion technology.

BACKGROUND

Conventionally, there exists a multitude of mechanisms for increasing output torque with respect to input torque (e.g., Patent Literature 1).

CITATION LIST

Patent Literature

Patent Literature 1: Japanese Patent Application Laid-Open No. H5-180285

SUMMARY OF INVENTION

Technical Problem

It is an object of the present invention to provide output torque greater than input torque.

Solution to Problem

To achieve the object, a first aspect of the present invention provides a torque conversion device that includes: a first rotor; a second rotor that has a rotating shaft disposed parallel to a rotating shaft of the first rotor; an at least one link portion that has a first mounting portion attached to the first rotor and a second mounting portion attached to the second rotor, the at least one link portion being interposed between the first rotor and the second rotor; and a weight that is attached to the at least one link portion and is disposed on any one of left and right sides of the first mounting portion. The at least one link portion has a distance between the first mounting portion and the second mounting portion equal to a distance between the rotating shaft of the first rotor and the rotating shaft of the second rotor, and has a distance between the rotating shaft of the first rotor and the first mounting portion equal to a distance between the rotating shaft of the second rotor and the second mounting portion. The first mounting portion is rotatably attached to at least one of the first rotor and the at least one link portion. When any one of the first rotor and the second rotor rotates, the other of the first rotor and the second rotor rotates, and the rotating shaft of the first rotor and the rotating shaft of the second rotor also rotate, and also the at least one link portion and the weight move.

In a second aspect of the present invention, the rotating shaft of the second rotor is preferably disposed obliquely below the rotating shaft of the first rotor, and the weight is preferably disposed on the same side of the rotating shaft of the first rotor as the rotating shaft of the second rotor in a left-right direction.

In a third aspect of the present invention, the at least one link portion mounted with the weight preferably includes a plurality of link portions, and the plurality of link portions preferably has respectively the first mounting portions attached to the first rotor at regular intervals in a circumferential direction of the first rotor. The plurality of link portions preferably has respectively the second mounting portions attached to the second rotor at regular intervals in a circumferential direction of the second rotor.

In a fourth aspect of the present invention, each of the first rotor and the second rotor preferably has a disc shape and the corresponding rotating shaft is preferably formed at the center of the disc shape.

Advantageous Effects of Invention

According to the first aspect of the present invention, in the torque conversion device, when a force that rotates the first rotor and the second rotor is input to at least one of the first rotor and the second rotor, torque is output from at least one of the rotating shaft of the first rotor and the rotating shaft of the second rotor. At this time, the torque conversion device is capable of outputting higher torque than the input torque by the action of the centrifugal force and the moment of inertia which are produced by the first and second rotors and the weights.

According to the second aspect of the present invention, the torque conversion device is capable of outputting further higher torque than the input torque.

According to the third aspect of the present invention, the torque conversion device is capable of outputting further higher torque than the input torque.

According to the fourth aspect of the present invention, the first and second rotors are simply configured to allow the torque conversion device to have a simple configuration.

BRIEF DESCRIPTION OF DRAWINGS

FIG. 13 is a diagram illustrating the results of output when mass of the weight is set to various values, and the number of revolutions of the rotor is varied.

DESCRIPTION OF EMBODIMENTS

One embodiment according to the present invention will now be described with reference to the accompanying drawings.

As an example, a torque conversion device is described in the embodiment.

Configuration

Figure 1:
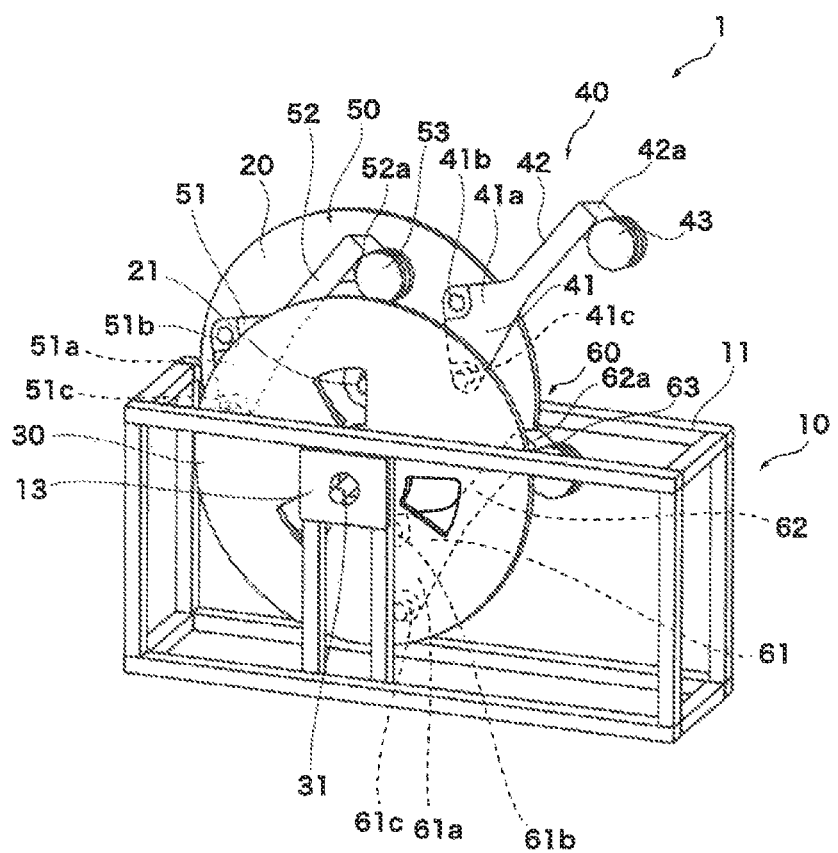
FIG. 1 is a perspective view illustrating an example configuration of a torque conversion device according to the embodiment.
Figure 2:
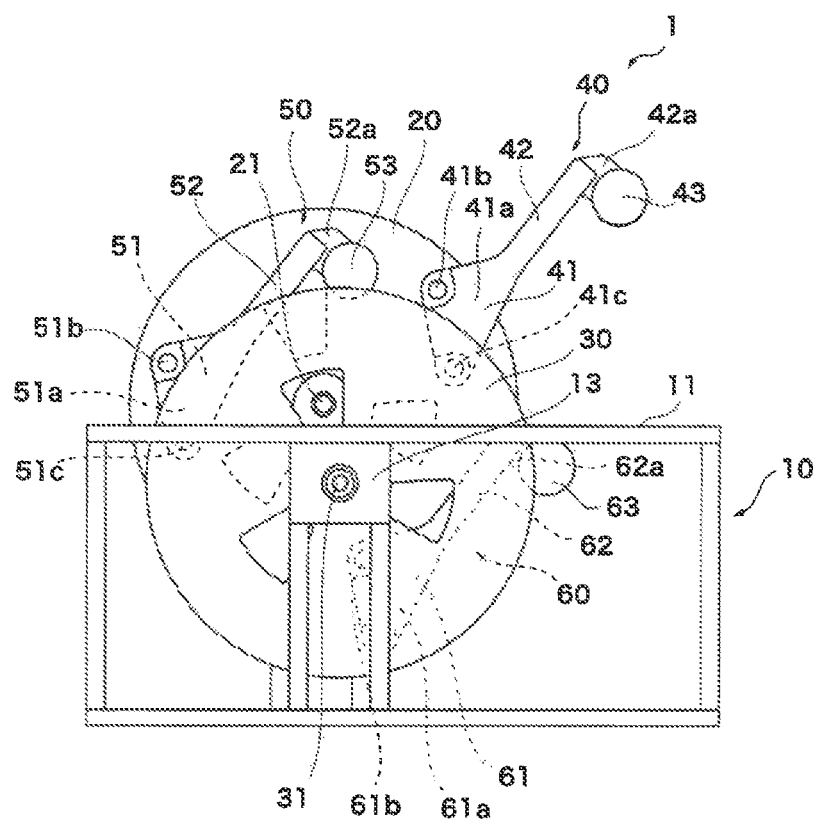
FIG. 2 is a front view illustrating the example configuration of the torque conversion device according to the embodiment.
Figure 3:
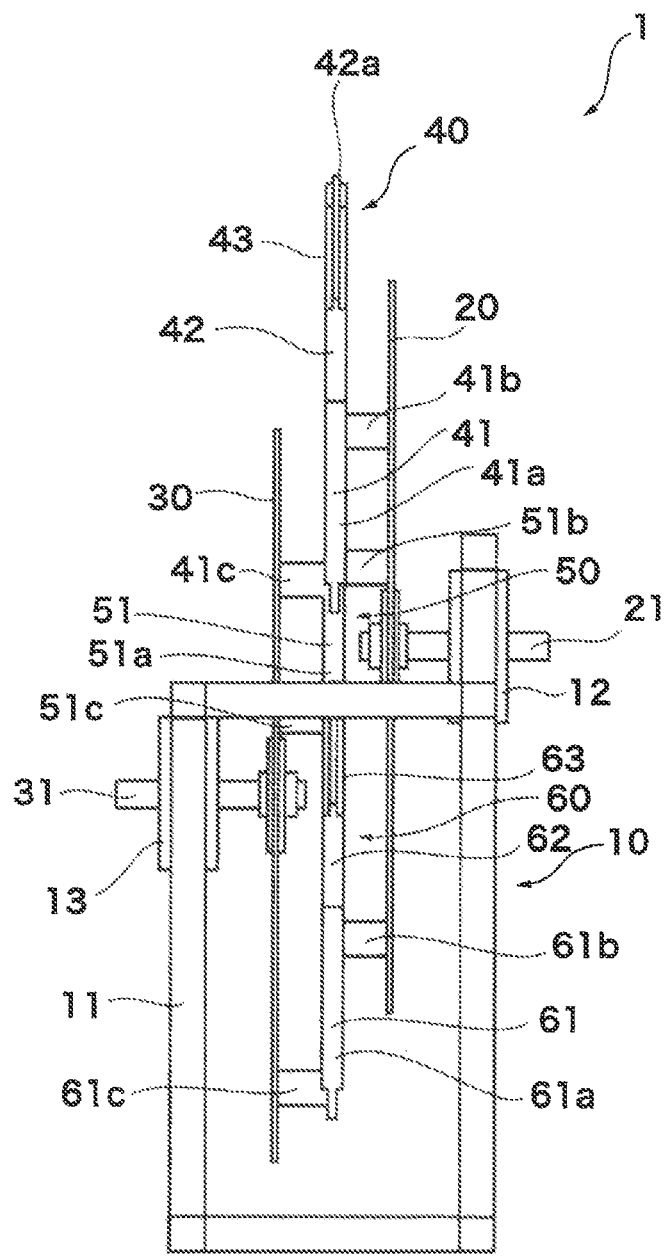
FIG. 3 is a side view illustrating the example configuration of the torque conversion device according to the embodiment.

FIGS. 1 to 3 are diagrams illustrating an example configuration of a torque conversion device 1 according to the embodiment, in which FIG. 1 is a perspective view, FIG. 2 is a front view and FIG. 3 is a side view.

As illustrated in FIGS. 1 to 3, the torque conversion device 1 has a support unit 10, first and second rotors 20, 30, and first, second and third arm links 40, 50, 60.

The support unit 10 rotatably supports the first and second rotors 20, 30. The support unit 10 has a leg section 11 and first and second rotation supporter 12, 13. The leg section 11 is composed of a plurality of rod-shaped frames assembled together to surround the first and second rotors 20, 30 and also support the first and second rotors 20, 30. The first and second rotation supporters 12, 13 are disposed on the frame located at the top side of the support unit 10.

The first rotation supporter 12 rotatably supports a first rotating shaft 21 of the first rotor 20. Also, the second rotation supporter 13 rotatably supports a second rotating shaft 31 of the second rotor 30. The first and second rotation supporters 12, 13 rotatably support the first and second rotors 20, 30 through bearings, for example.

The first and second rotors 20, 30 are identical in shape with each other, which are formed in approximate disc shape in approximate plate form. The first rotor 20 and the second rotor 30 are arranged in parallel to face each other. The first and second rotors 20, 30 are respectively provided with the first and second rotating shafts 21, 31 disposed respectively on the faces (hereinafter referred to as "outside faces") on the opposite side from the mutually facing faces and also at the centers of the discs of the first and second rotors 20, 30. When viewed with respect to the rotating shafts 21, 31, the second rotor 30 is placed such that the second rotating shaft 31 is disposed obliquely below the first rotating shaft 21 (obliquely below and on the right side of the first rotating shaft 21 in FIG. 2). The first rotating shaft 21 is rotatably supported by the first rotation supporter 12 which is attached to the frame facing the outside face of the first rotor 20, so that the first rotor 20 is allowed to rotate. Also, the second rotating shaft 31 is rotatably supported by the second rotation supporter 13 which is attached to the frame facing the outside face of the second rotor 30, so that the second rotor 30 is allowed to rotate. Also, in the example, each of the first and second rotors 20, 30 is perforated with a plurality of holes for appropriate weight reduction in order to prevent the center of gravity from being offset from the center of rotation.

Three, first to third arm links 40, 50, 60 are attached to the first and second rotors 20, 30 to be sandwiched between the first rotor 20 and the second rotor 30. Each of the first to third arm links 40, 50, 60 is formed in an approximately plate shape, in which a link portion 41, 51, 61 and an arm portion 42, 52, 62 are formed integrally with each other. In the respective link portions 41, 51, 61, approximately triangle shaped main bodies 41a, 51a, 61a are disposed between the first rotor 20 and the second rotor 30. The link portions 41, 51, 61 have respectively first mounting portions 41b 51b, 61b standing at right angles on the inside faces of the main bodies 41a, 51a, 61a, and the link portions 41, 51, 61 also have respectively second mounting portions 41c 51c, 61c standing at right angles on the outside faces of the main bodies 41a, 51a, 61a. In this respect, the first and second mounting portions 41b, 51b, 61b, 41c, 51c, 61c are rotatably attached to the main bodies 41a, 51a, 61a. For example, the first and second mounting portions 41b, 51b, 61b, 41c, 51c, 61c are rotatably attached via bearings to the main bodies 41a, 51a, 61a. And, the first mounting portions 41b, 51b, 61b have respectively distal ends secured to the inside face of the first rotor 20. Also, the second mounting portions 41c, 51c, 61c have respectively distal ends secured to the inside face of the second rotor 30. With such structure, the link portions 41, 51, 61 are mounted to be interposed between the first rotor 20 and the second rotor 30.

In this respect, rotatably mounting the first and second mounting portions 41b, 51b, 61b, 41c, 51c, 61c to the main bodies 41a, 51a, 61a enables the arm links 40, 50, 60 to change in attitude relative to the first and second rotors 20, 30.

Also, the first mounting portions 41b, 51b, 61b of the respective first to third arm links 40, 50, 60 are attached to the first rotor 20 at regular intervals in the circumferential direction of the first rotor 20. Also, the second mounting portions 41c, 51c, 61c of the respective first to third arm links 40, 50, 60 are attached to the second rotor 30 at regular intervals in the circumferential direction of the second rotor 30. Thereby, the first to third arm links 40, 50, 60 are arranged at regular intervals in the circumferential direction on each of the first and second rotors 20, 30.

Here, in projection plane when the torque conversion device 1 is viewed from the front (FIG. 2 is viewed from the front), or in projection plane when the torque conversion device 1 is viewed from a point of view in the axis direction of the first rotating shaft 21 or the second rotating shaft 31, the distance between the first mounting portions 41b, 51b, 61b and the second mounting portions 41c, 51c, 61c is equal to the distance between the first rotating shaft 21 and the second rotating shaft 31, and also the distance between the first rotating shaft 21 and the first mounting portions 41b, 51b, 61b is equal to the distance between the second rotating shaft 31 and the second mounting portions 41c, 51c, 61c. The first mounting portions 41b, 51b, 61b and the second mounting portions 41c, 51c, 61c have such a positional relationship. As a result, when any one of the first and second rotors 20, 30 rotates, the other one of the first and second rotors 20, 30 also rotates.

The arm portions 42, 52, 62 of the respective first to third arm links 40, 50, 60 are formed integrally with the link portions 41, 51, 61, respectively. The arm portions 42, 52, 62 have respectively distal ends 42a, 52a, 62a shaped to bend obliquely downward. Each of the arm portions 42, 52, 62 is shaped to extend obliquely upward and is disposed on the same side (the right side in FIG. 2) of the first rotating shaft 21 as the second rotating shaft 31 in the left-right direction (when viewed in the axis direction of the first rotating shaft 21). The arm portions 42, 52, 62 have weights 43, 53, 63 placed at the distal ends 42a, 52a, 62a, respectively. In this way, the weights 43, 53, 63 are disposed on the same side (the right side in FIG. 2) of the rotating shaft of the first rotor 20 as the rotating shaft of the second rotor 30 in the left-right direction.

Operation, Action and Others

Figure 4:
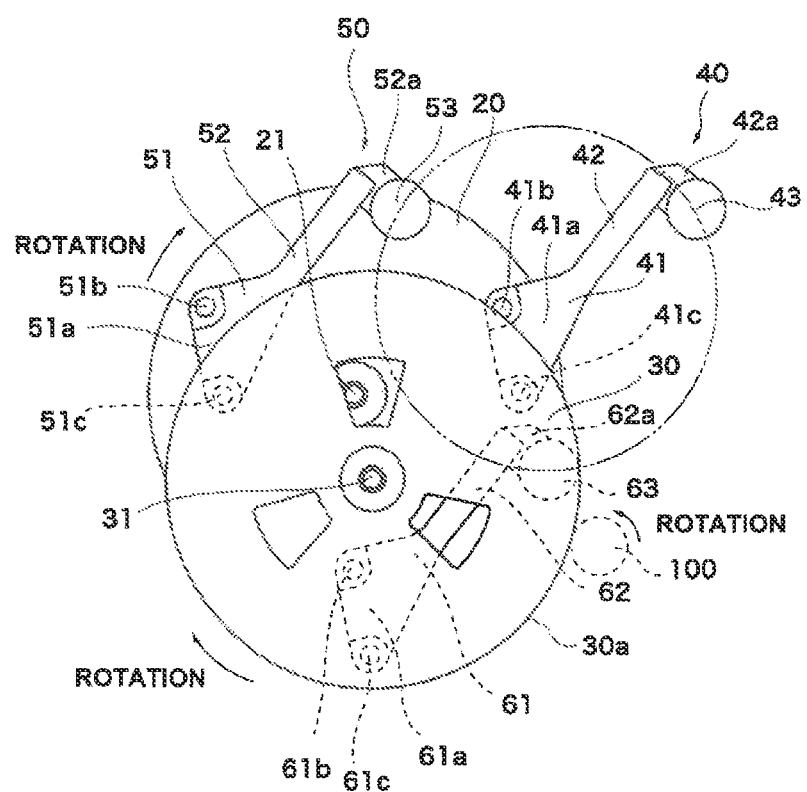
FIG. 4 is a diagram illustrating an example configuration when rotating first and second rotors and first, second and third arm links which make up part of the torque conversion device.
Figure 5:
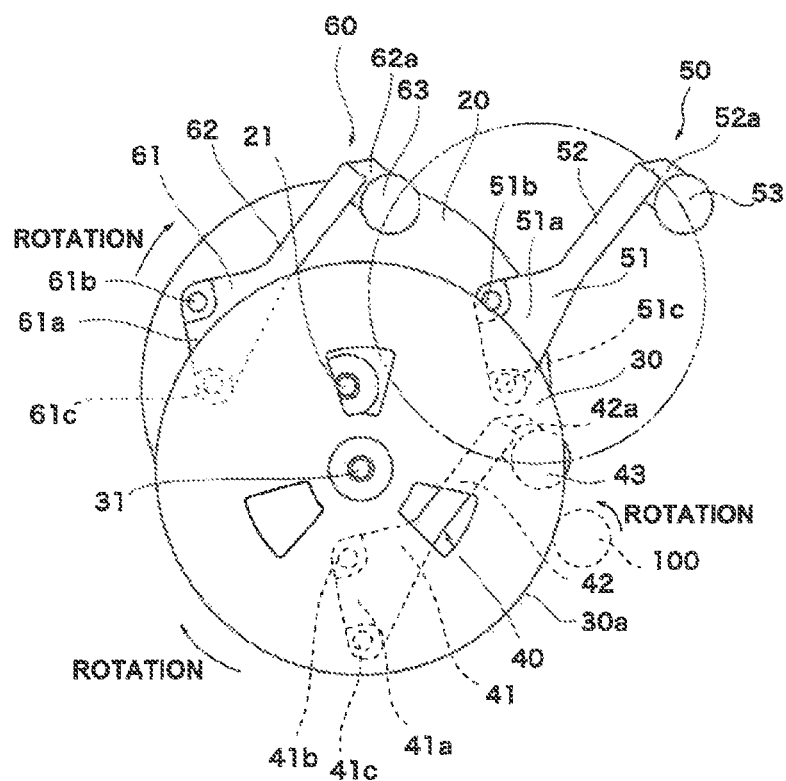
FIG. 5 is another diagram illustrating the example configuration when rotating the first and second rotors and the first, second and third arm links which make up part of the torque conversion device.
Figure 6:
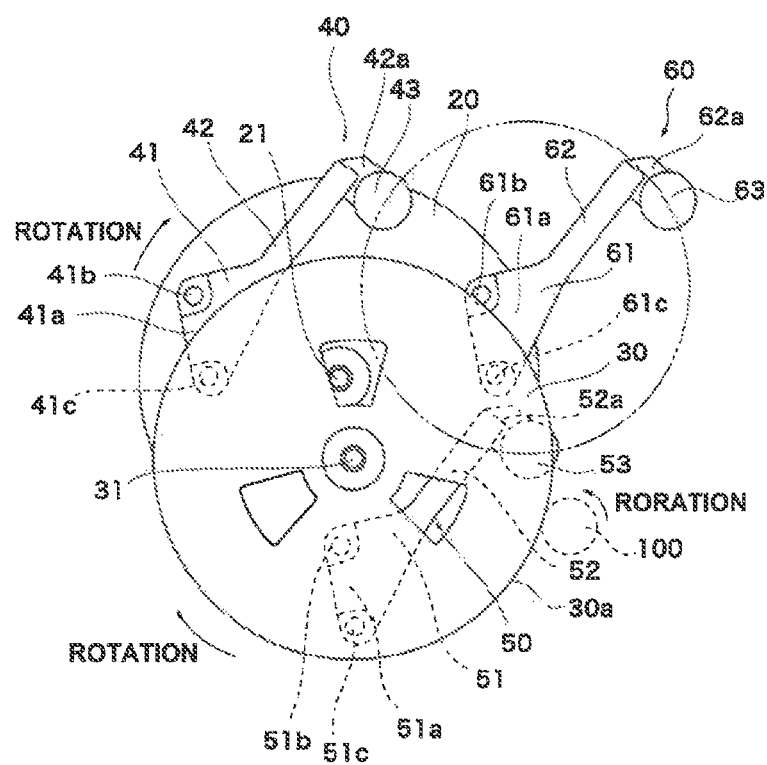
FIG. 6 is still another diagram illustrating the example configuration when rotating the first and second rotors and the first, second and third arm links which make up part of the torque conversion device.

Examples of operation, action of the operation and others of the torque conversion device 1 are described below. FIGS. 4 to 6 are diagrams illustrating example configurations of the first and second rotors 20, 30 and the first, second and third arm links 40, 50, 60 which make up part of the torque conversion device 1, to describe the operation, the action of the operation and the like.

In the torque conversion device 1, a rotating shaft 100 of a rotary motor which is an input portion to the torque conversion device 1 is placed into contact with the perimeter surface of the second rotor 30 to rotate the second rotor 30, and torque is extracted from the second rotating shaft 31 which is rotating in concert with the second rotor 30. For example, a rotating member such as a gear and/or the like is mounted to the rotating shaft 100 of the rotary motor, and the rotating member is placed into contact with the perimeter surface 30a of the second rotor 30. Then, the rotating shaft 100 of the rotary motor is rotated to rotate the second rotor 30.

Upon the rotation of the second rotor 30, the turning force is transmitted to the first rotor 20 via the arm links 40, 50, 60, so that the first rotor 20 also rotates in conjunction with the rotation of the second rotor 30. At this time, for example, by the structure in which the first and second mounting portions 41b, 51b, 61b, 41c, 51c, 61c are rotatably attached to the main bodies 41a, 51a, 61a, and the like, each of the arm links 40, 50, 60 maintains its attitude, that is, each arm portion 42, 52, 62 maintains its attitude oriented in the obliquely upward direction, while the arm link 40, 50, 60 changes its position relative to the first and second rotors 20, 30 and moves in a particular circular trajectory. Looking at the movement of the weights 43, 53, 63, as illustrated in changes from FIG. 4 to FIG. 6 (changes caused by the first and second rotors 20, 30 rotating by an angle of 120 degrees), when the first and second rotors 20, 30 rotate, the weights 43, 53, 63 move along the predetermined circular trajectory illustrated by a dash-dot-dot line in FIGS. 4 to 6. Likewise, the first to third arm links 40, 50, 60 also move along a predetermined circular trajectory which is different to the trajectory of the movement of the weights 43, 53, 63.

At this stage, the input from the rotary motor is assisted by the centrifugal force and the moment of inertia that are produced on the first and second rotors 20, 30 (parts of the first and second rotors 20, 30 except the rotating shafts 21, 31) and the first to third arm links 40, 50, 60 which are moving in the circular trajectories. Because of this, higher torque than the torque directly obtained from the input from the rotary motor can be obtained from the second rotating shaft 31.

Advantageous Effects in the Embodiment (1) In the torque conversion device 1, when a force that rotates the second rotor 30 is input to the second rotor 30, torque is output from the second rotating shaft 31 of the second rotor 30. At this time, the torque conversion device 1 is capable of outputting higher torque than the input torque by the action of the centrifugal force and the moment of inertia which are produced by the first and second rotors 20, 30 (parts of the first and second rotors 20, 30 except the rotating shafts 21, 31) and the arm links 40, 50, 60 including the weights 43, 53, 63.

(2) The torque conversion device 1 is capable of outputting further higher torque than the input torque by virtue of: the second rotating shaft 31 being disposed obliquely below the first rotating shaft 21; and the weights 43, 53, 63 being disposed on the same side of the first rotating shaft 21 as the second rotating shaft 31 in the left-right direction.

(3) The torque conversion device 1 is capable of outputting further higher torque than the input torque by having the plurality of arm links 40, 50, 60.

(4) The torque conversion device 1 has a simple configuration because the first and second rotors 20, 30 are simply formed in a disc shape.

Consideration of Principle

Figure 7:
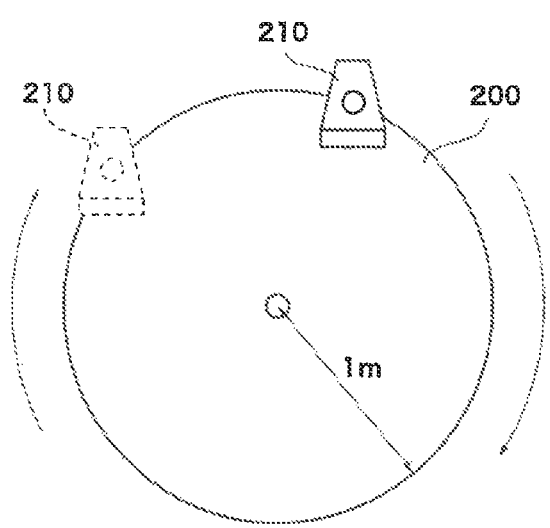
FIG. 7 is a diagram for describing the principle of the torque conversion device according to the embodiment.

Torque provided by the torque conversion device 1 according to the embodiment will now be discussed. FIG. 7 is a diagram describing the principle of the torque conversion device 1 according to the embodiment.

As illustrated in FIG. 7, a weight 210 is mounted on the perimeter of a disc (rotor) 200. If the weight 210 is allowed to move freely from the vicinity of the highest position on the perimeter trajectory defined by the perimeter of the disc 200, the weight 210 moves downward along the perimeter trajectory of the disc 200. Then, the energy when the weight 210 reaches the lowest position in the perimeter trajectory of the disc 200, becomes potential energy mgh. And, because of the potential energy, in turn, the weight 210 moves upward along the perimeter trajectory of the disc 200. However, because of energy loss by friction of a rotating shaft of the disc 200 and the like, the weight 210 does not return to the vicinity of the top of the perimeter trajectory of the disc 200.

Figure 8:
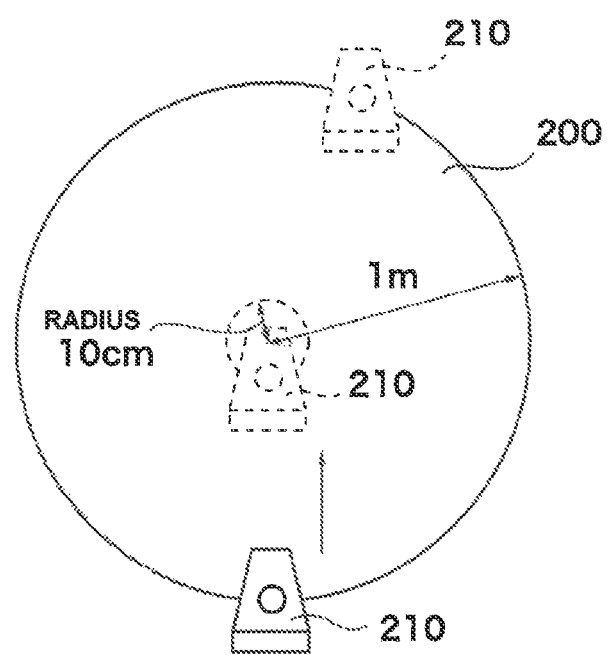
FIG. 8 is another diagram for describing the principle of the torque conversion device according to the embodiment.

FIG. 8 is another diagram for describing the principle of the torque conversion device 1 according to the embodiment.

As illustrated in FIG. 8, assuming that at the moment when the weight 210 reaches the bottom in the trajectory of the disc 200, the distance from the center of rotation of the disc 200 to the weight 210 becomes 10 cm in a moment, the 90 cm energy can be conceived in the weight 210.

Figure 9:
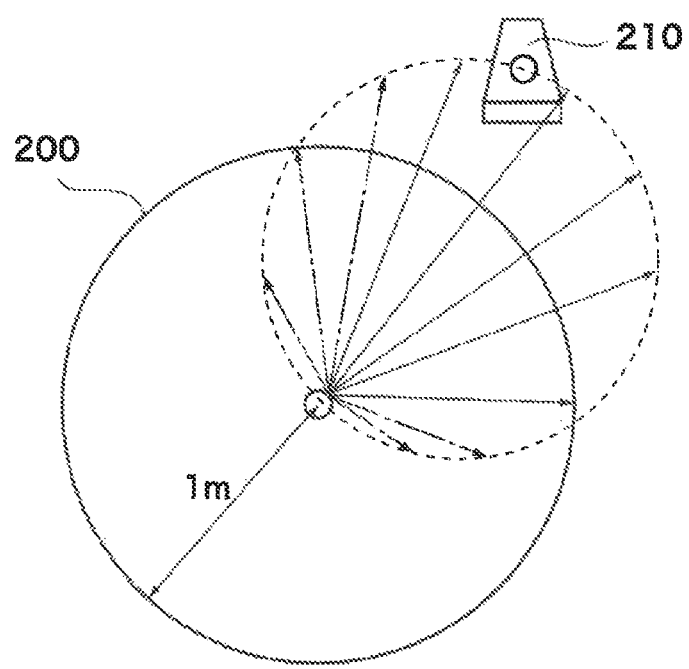
FIG. 9 is a diagram illustrating the movement of a weight in the torque conversion device according to the embodiment.

FIG. 9 is a diagram illustrating the movement of the weight in the torque conversion device 1 according to the embodiment.

As illustrated in FIG. 9, in the case of the torque conversion device 1 according to the embodiment, the weight 210 moves relative to the disc 200 in the trajectory indicated by the broken line. Specifically, an ideal movement in FIG. 8 is offset to the first quadrant in the x-z plane and the time-varying parallel axis theorem in moment of inertia is applied. With such structure, the torque conversion device 1 according to the embodiment saves the potential energy required for upward movement of the weights 43, 53, 63 as much as possible, and thus achieves torque equivalent to the energy obtained by the product of the moment of inertia and an angular acceleration.

Derivation of Torque

Figure 10:
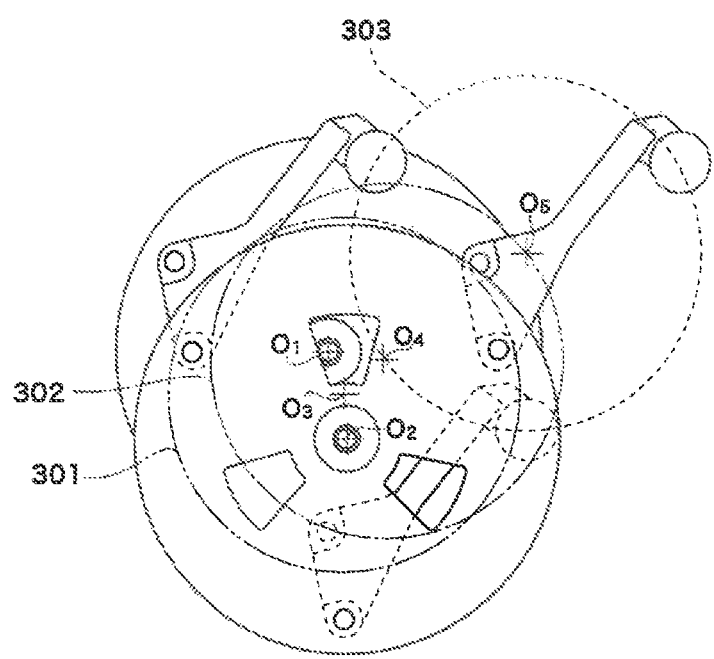
FIG. 10 is a diagram illustrating the process of deriving a relational expression of torque in the torque conversion device according to the embodiment.

FIG. 10 is a diagram illustrating the configuration of the first and second rotors 20, 30 and the first to third arm links

40, 50, 60 of the torque conversion device 1 according to the embodiment. The process of deriving a relational expression for torque in the torque conversion device 1 according to the embodiment is described with reference to FIG. 10.

Here, in FIG. 10, a circle (hereinafter referred to as a "first imaginary circle") 301 indicated by a dash-dot-dot line represents a trajectory passing through all the midpoints between the first mounting portions 41b, 51b, 61b and the second mounting portions 41c, 51c, 61c of the first to third arm links 40, 50, 60. The first imaginary circle 301 may equally be a so-called imaginary rotor such as a combination of the first rotor 20 and the second rotor 30. Further, a circle (hereinafter referred to as a "second imaginary circle") 302 indicated by a dash-dot line represents a circle passing through the centers of gravity of the respective first to third arm links 40, 50, 60. A circle (hereinafter referred to as a "third imaginary circle") 303 indicated by a broken line represents a movement trajectory of the weights 43, 53, 63. Also, reference sign $O_1$ is the center of the first rotor 20. Reference sign $O_2$ is the center of the second rotor 30. Reference sign $O_3$ is the center of the first imaginary circle 301. Reference sign $O_4$ is the center of the second imaginary circle 302. Reference sign $O_5$ is the center of the third imaginary circle 303. In this regard, the center $O_3$ of the first imaginary circle 301 is assumed as an origin point of an absolute coordinate system in the torque conversion device 1 according to the embodiment. In the following description, $(x_{03}, y_{03})$ is coordinates of the center $O_3$ of the first imaginary circle 301. $(x_{04}, y_{04})$ is coordinates of the center $O_4$ of the second imaginary circle 302. $(x_{05}, y_{05})$ is coordinates of the center $O_5$ of the third imaginary circle 303.

The torque conversion device 1 has mainly two torque sources of first torque $T_{inertia}$ arising from moment of inertia produced by rotation of the three weights 43, 53, 63, and second torque $T_g$ arising from the gravity of the three weights 43, 53, 63, the torques being combined together and then output.

Derivation of First Torque $T_{inertia}$

A method of deriving the first torque $T_{inertia}$ is described.

Initially, a centrifugal force F that acts on the weight 210 moving in a circular motion is expressed by Expression (1).

$$F = \frac{mv^2}{r} = mr\omega^2 \quad (1)$$

At this time, a tangential velocity of the weights 43, 53, 63 is $v = r\omega$. By Expression (1), the centrifugal force F at the center $O_2$ of the second rotor 30 for each weight 43, 53, 63 is given by Expression (2).

$$F_i = mr_i(t)\omega^2 \quad (2)$$

An important point here is that radius $r_i(t)$, that is, a radius varies with time. Here, radius $r_i(t)$ is geometrically determined because each of the arm links 40, 50, 60 is of a non-extendable, fully rigid body, and angular velocities are constant (equal), i.e., the angular velocity when the first imaginary circle 301 representing a trajectory passing through all the midpoints between the first mounting portions 41b, 51b, 61b and the second mounting portions 41c, 51c, 61c of the first to third arm links 40, 50, 60 is assumed as a rotor, and the angular velocity of the weights 53, 53, 63 moving along the trajectory of the third imaginary circle 303.

A total sum of centrifugal forces from position coordinates to position coordinates for the three weights 43, 53, 63 which are regularly spaced at an angle $\pi/3$ from each other is given by Expression (3).

$$F = \sum_{i=1}^{3} F_i = \sum_{i=1}^{3} mr_i(t)\omega^2 = m\omega^2 \sum_{i=1}^{3} r_i(t) \quad (3)$$

In Expression (3), it is seen that the radius $r_i(t)$ causes an increase/decrease in centrifugal force, but the range in which the radius changes is expressed by Expression (4).

$$r_{min} < r_i(t) < r_{max} \quad (4)$$

Therefore, if the radius $r_i(t)$ changes within the range of Expression (4), the total sum of centrifugal forces will change by a value obtained by multiplying the changing radius $r_i(t)$ by mass $m_0$, $\omega_2$ of the weights 43, 53, 63.

Summing up the foregoing, from the relationship between the moment of inertia and the angular acceleration, the torque $T_{inertia}$ obtained by the torque conversion device 1 is given by Expression (5).

$$T_{inertia} = \left\{ \frac{M_3 R_3^2}{2} + \left(3I_4 + M_4 \sum_{j=1}^{3} a_j^2(t)\right) + \left(3I_0 + m_0 \sum_{i=1}^{3} r_i^2(t)\right) \right\} \dot{\omega}(t) \quad (5)$$

Where a term { } of Expression (5) is a term of moment of inertia produced by the torque conversion device 1. Further, values in Expression (5) may be shown as Expression (6) to Expression (11).

$$r_i(t) = \sqrt{(x_{05} + r_{xi}(t))^2 + (y_{05} + r_{yi}(t))^2} \quad (6)$$

$$r_{x1} = r_k \cos(\omega t + \theta_0),\ r_{y1} = r_k \sin(\omega t + \theta_0) \quad (7)$$

$$r_{x2} = r_k \cos\left(\omega t + \theta_0 + \frac{\pi}{3}\right),\ r_{y2} = r_k \sin\left(\omega t + \theta_0 + \frac{\pi}{3}\right),$$

$$r_{x3} = r_k \cos\left(\omega t + \theta_0 + \frac{2\pi}{3}\right),\ r_{y3} = r_k \sin\left(\omega t + \theta_0 + \frac{2\pi}{3}\right),$$

$$a_j(t) = \sqrt{(x_{04} + a_{xj}(t))^2 + (y_{04} + a_{yj}(t))^2} \quad (8)$$

$$a_{x1} = a_k \cos(\omega t + \theta_0),\ a_{y1} = a_k \sin(\omega t + \theta_0) \quad (9)$$

$$a_{x2} = a_k \cos\left(\omega t + \theta_0 + \frac{\pi}{3}\right),\ a_{y2} = a_k \sin\left(\omega t + \theta_0 + \frac{\pi}{3}\right),$$

$$a_{x3} = a_k \cos\left(\omega t + \theta_0 + \frac{2\pi}{3}\right),\ a_{y3} = a_k \sin\left(\omega t + \theta_0 + \frac{2\pi}{3}\right),$$

$$I_4 = \frac{M_4 R_{M4}^2}{2} \quad (10)$$

$$I_0 = \frac{m_0 R_0^2}{2} \quad (11)$$

Where $M_3$ is mass of the imaginary rotor which is obtained by adding mass $M_1$ of the first rotor 20 and mass $M_2$ of the second rotor 30 together. $r_3$ is a radius of the first imaginary circle 301. $I_4$ is moment of inertial produced by each of the arm links 40, 50, 60. $M_4$ is mass of each of the arm links 40, 50, 60. $R_{M4}$ is a radius of the second imaginary circle 302. $I_0$ is moment of inertial produced by each of the weights 43, 53, 63. $m_0$ is mass of each of the weights 43, 53, 63. $R_0$ is a radius of the third imaginary circle 303. It is noted that the above relationship is determined by using the parallel axis theorem in moment of inertia.

It is noted here that moment of inertia $I_1$ produced by the first rotor 20 and moment of inertia $I_2$ produced by the second rotor 30 are expressed by Expression (12) and Expression (13).

$$I_1 = \frac{M_1 R_1^2}{2} \quad (12)$$

$$I_2 = \frac{M_2 R_2^2}{2} \quad (13)$$

Where $M_1$ is mass of the first rotor 20. $R_1$ is a radius of the first rotor 20. $M_2$ is mass of the second rotor 30. $R_2$ is a radius of the second rotor 30.

Derivation of Second Torque $T_g$

Figure 11:
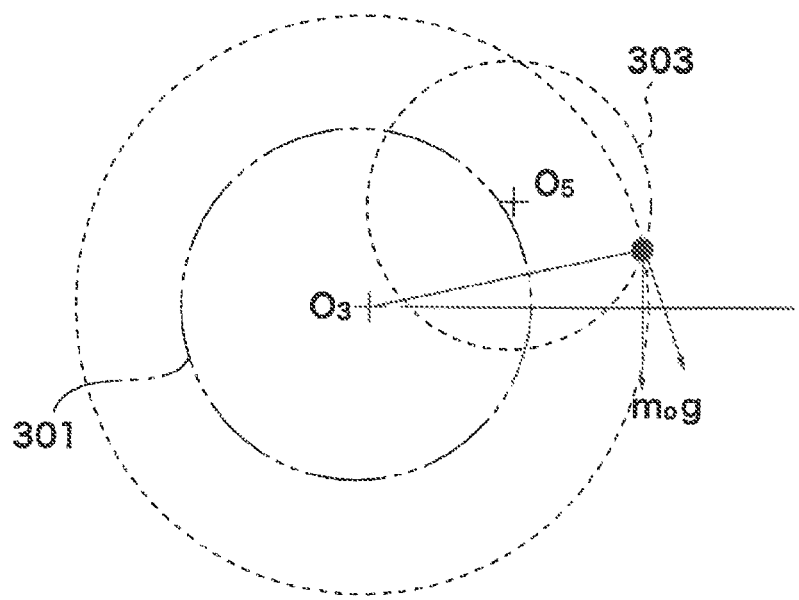
FIG. 11 is a diagram illustrating values used to derive second torque Tg.

A method of deriving the second torque $T_g$ is described below. FIG. 11 is a diagram illustrating values used to derive the second torque $T_g$.

Initially, a distance L between the center $O_3$ ($x_{03},y_{03}$) of the first imaginary circle 301 and the center $O_5$ ($x_{05},y_{05}$) of the third imaginary circle 303 is expressed by Expression (14).

$$L^2 = x_{05}^2 + y_{05}^2 \quad (14)$$

Also, the trajectory of the circle defined by the centers of gravity (x,y) of the weights 43, 53, 63 is expressed by Expression (15).

$$(x-X_0)^2 + (y-Y_0)^2 = r_0^2 \quad (15)$$

Where $r_0$ is a radius of the third imaginary circle 303. Also, because of x=r·cos θ, y=r·sin θ, Expression (15) is expressed as Expression (16).

$$r^2 - 2(X_0 \cos \theta + Y_0 \sin \theta)r + L^2 - r_0^2 = 0 \quad (16)$$

Thereby, Expression (17) is obtained.

$$r = (X_0 \cos \theta + Y_0 \sin \theta) + \sqrt{(X_0 \cos \theta + Y_0 \sin \theta)^2 - (L^2 - r_0^2)} \quad (17)$$

Where r is a distance from the center $O_5$ ($x_{05},y_{05}$) of the third imaginary circle 303 to the centers of gravity (x,y) of the weights 43, 53, 63.

Also, torque $T_0$ by the gravity of the weights 43, 53, 63 is expressed by Expression (18).

$$T_0 = m_0 g r \cos \theta \quad (18)$$

Where g is an acceleration of gravity. The three weights 43, 53, 63 also have respective initial angles, $\theta_0$, $\theta_0 + \pi/3$, $\theta_0 + 2\pi/3$, and a component obtained by multiplying an angular velocity ω and time t together is added to each initial angle. Thus, torque $T_g$ by the combined gravity can be expressed by Expression (19).

$$T_g = m_0 g r \left\{ \cos(\omega t + \theta) + \cos\left(\omega t + \theta + \frac{\pi}{3}\right) + \cos\left(\omega t + \theta + \frac{2\pi}{3}\right) \right\} \quad (19)$$

In this manner, the first torque $T_{inertia}$ and the second torque $T_g$ can be derived. Then, torque $T_{total}$ mainly achieved by the torque conversion device 1 according to the embodiment is expressed by Expression (20).

$$T_{total} = T_{inertia} + T_g \quad (20)$$

Figure 12:
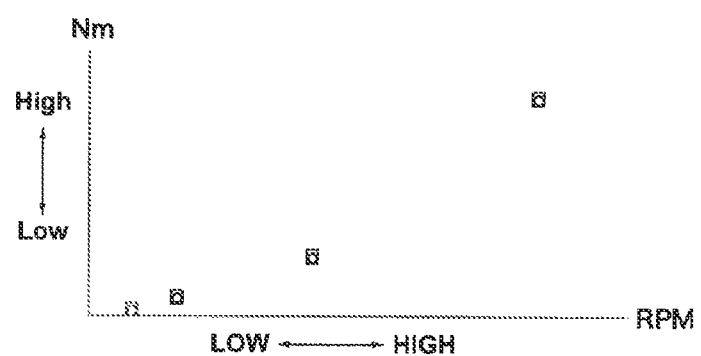
FIG. 12 is a diagram illustrating an example of the relationship between torque (Nm) and the number of revolutions (RPM) of the rotor in the torque conversion device according to the embodiment.

FIG. 12 is a diagram illustrating an example of the relationship between torque (Nm) and the number of revolutions (RPM) of the rotor in the torque conversion device 1 according to the embodiment. As illustrated in FIG. 12, the torque increases with increases in the number of revolutions of the rotor.

Related Description

For example, on the assumption of a combination of a gear with 10 teeth and a gear with 5 teeth, if the gear with 10 teeth is rotated 10 turns with a force of 98(N), the gear with 5 teeth is rotated 20 turns with a force of 49(N) which is a half of the force of 98(N). The products of the number of revolutions and both the forces are 98×10=48×20=980, becoming equal.

Stated another way, this means that, by each gear, the force and the number of revolutions can be converted but the workload actually involving is not able to be changed. This is the same in "the principle of leverage" and "the principle of movable pully". Therefore, in the torque conversion device 1, if the number of revolutions can be increased by any input, the force to be exerted can be increased accordingly. However, because of the law of conservation of energy (i.e., workload), the work on the output side takes any value never exceeding the total sum of the kinetic energies of the rotors 20, 30 and the weights 43, 53, 63 which move in the trajectory of the third imaginary circle 303, in FIG. 10.

Figure 14:
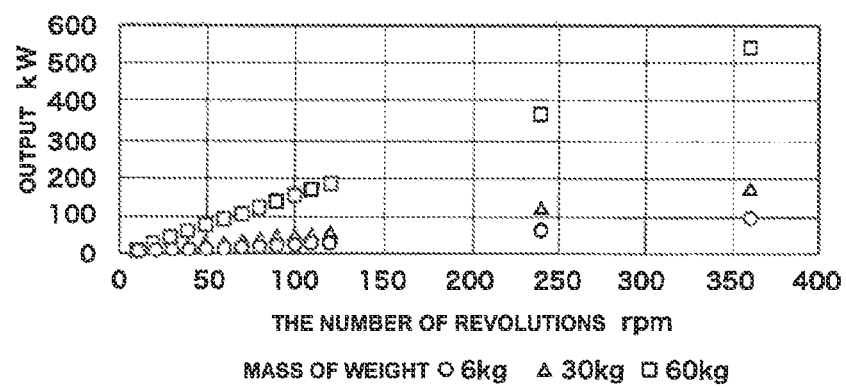
FIG. 14 is a diagram illustrating a graph of the results of FIG. 13.

FIG. 13 is a diagram illustrating the results of output (kw) when mass $m_0$ (Kg) of the weight 43, 53, 63 is set to various values, such as 6, 30 and 90, and the number of revolutions (rpm) of the rotor 20, 30 is varied. FIG. 14 is a diagram illustrating a graph of the results of FIG. 13. Here, the output (kw) is 2π×T(torque)×n/6000. Also, the output (kw) is obtained within a rated range of an envisaged electric generator. Also, the mass $m_0$ (Kg) of the weight 43, 53, 63 is mass of each weight.

For reference sake, the instant center theorem (Kennedy theorem) defines a point having zero velocity vector when a rigid body in rotational motion extends imaginarily. However, assuming that an observer is standing still and a velocity vector is a velocity relative to the observer at rest. If the definition is broadened in contemplation of the case where an observer and a coordinate system is moving, the "point with zero velocity vector" may be defined intuitively as a "point of minimum motion". In more intuitive representation of the definition, if the rigid body in motion is assumed as being in rotational motion about a certain point at a certain instant, the center point is the instant center. The instant center may be located within or without the object. If a rigid body is in parallel linear motion, for the sake of convenience, the instant center is assumed as being located at a point at infinity in a direction perpendicular to the velocity vector.

Figure 15:
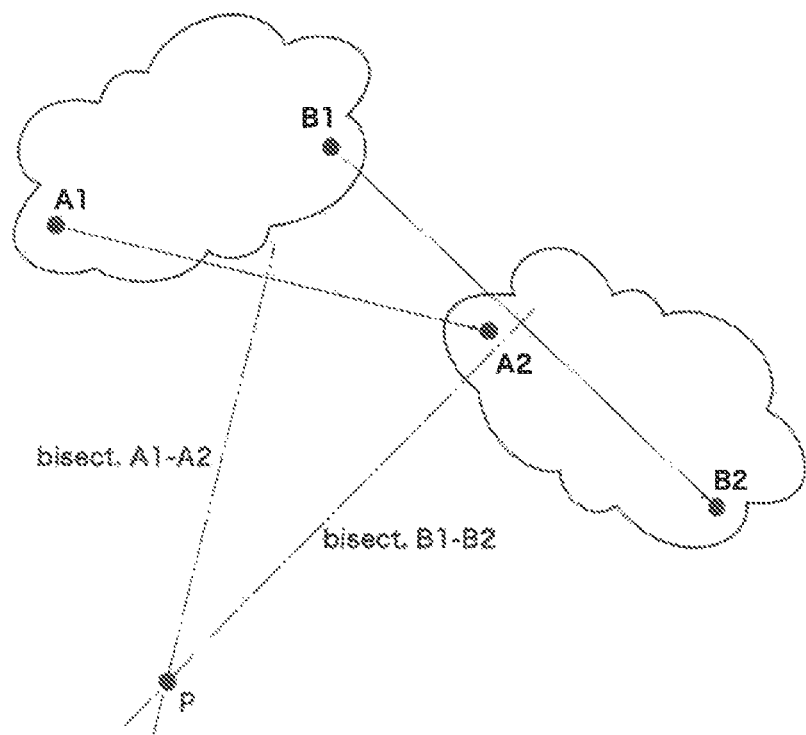
FIG. 15 is a diagram describing the instant center.

Here, when a position vector and a velocity vector at two points on a rigid body at a certain instant are determined, the instant center is located at an intersection point of perpendicular lines extending from the positions of the two points in the perpendicular direction of the velocity vector. FIG. 15 is a diagram describing the instant center, in which, where points A1, B1 move to points A2, B2, the point P becomes the instant center.

Modifications of the Embodiment

In a modification of the embodiment, the first and second rotors 20, 30 may be formed in any different size and shape from those described above. Thus, the first and second rotors 20, 30 can be formed with various weights. For example, the first and second rotors 20, 30 may be perforated with weight reduction holes that differ in shape and number from the weight reduction holes described above, in order to prevent the center of gravity from being offset from the center of rotation. For example, the first and second rotors 20, 30 may also be formed in another shape rather than a disc shape. For example, the first and second rotors 20, 30 may be formed in a 3D shape such as a spherical body and the like.

In another modification of the embodiment, a different distance from the distance described above may be set for the distance between the first rotating shaft 21 of the first rotor 20 and the second rotating shaft 31 of the second rotor 30, in particular, the distance in projection plane when the torque conversion device 1 is viewed from the front (FIG. 2 is viewed from the front), or the distance in projection plane when the torque conversion device 1 is viewed from a point of view in the axis direction of the first rotating shaft 21 or the second rotating shaft 31.

In another modification of the embodiment, a different positional relationship from the above-described positional relationship may be established for the positional relationship between the first rotating shaft 21 of the first rotor 20 and the second rotating shaft 31 of the second rotor 30, in particular, the positional relationship in projection plane when the torque conversion device 1 is viewed from the front (FIG. 2 is viewed from the front), or the positional relationship in projection plane when the torque conversion device 1 is viewed from a point of view in the axis direction of the first rotating shaft 21 or the second rotating shaft 31. That is, the first rotating shaft 21 and the second shaft 31 are required to be disposed separately from each other in the left and right directions, irrespective of whether which is located on the left or right side. In this case, the center of the circular movement trajectory of at least the weights 43, 53, 63 in the arm links 40, 50, 60 is disposed on any one of the left and right sides of the first rotating shaft 21 and the second shaft 31.

In another modification of the embodiment, the arm links 40, 50, 60 may be configured to differ in size, shape, length and inclination angle from the size, shape, length and inclination angle which have been described above. For example, the torque conversion device 1 may have the arm portions 42, 52, 62 elongated as much as possible, unless, when the arm links 40, 50, 60 are moving, the arm links 40, 50, 60 come into contact with the structure of the torque conversion device 1, for example, come into contact with the first and second mounting portions 41b, 51b, 61b, 41c, 51c, 61c. Therefore, the torque conversion device 1 is capable of outputting higher torque than input torque.

In another modification of the embodiment, the arm links 40, 50, 60 can be extended and contracted unless the arm links 40, 50, 60 come into contact with the structure of the torque conversion device 1 when the arm links 40, 50, 60 are moving.

In another modification of the embodiment, the number of the arm links 40, 50, 60 is not limited to three, but may be less than three or four or more.

In another modification of the embodiment, the weights 43, 53, 63 of the arm links 40, 50, 60 may be formed in different sizes and shapes from those described above. Thus, the weights 43, 53, 63 can be designed to have various weights.

In another modification of the embodiment, the arm links 40, 50, 60 may be structured to be provided actually with no weight 43, 53, 63 as long as the arm portions 42, 52, 62 weigh as described above. In this case, the arm portions 42, 52, 62 function as the weights 43, 53, 63.

In another modification of the embodiment, the first mounting portions 41b, 51b, 61b may be structured to be mounted rotatably to at least any of the first rotor 20 and the link portions 41, 51, 61. Likewise, the second mounting portions 41c, 51c, 61c may be structured to be mounted rotatably to at least any of the second rotor 30 and the link portions 41, 51, 61.

In another modification of the embodiment, the torque conversion device 1 may be configured such that a force that rotates the first rotor 20 and the second rotor 30 is input to at least one of the first rotor 20 and the second rotor 30, and torque is extracted from at least one of the first rotating shaft 21 of the first rotor 20 and the second rotating shaft 31 of the second rotor 30.

In another modification of the embodiment, the torque conversion device 1 may be configured such that a force rotating the first rotor 20 and the second rotor 30 is input to a side (front side or back side) of the perimeter surface 30a of the second rotor 30 or the first rotor 20.

In another modification of the embodiment, the torque conversion device 1 may be configured such that a force rotating the first rotor 20 and the second rotor 30 is input to the rotating shafts 21, 31.

In another modification of the embodiment, the torque conversion device 1 may be configured such that input is applied to at least one of the arm links 40, 50, 60. In this case, for example, the input is applied to the weights 43, 53, 63 in the moving direction of the weights 43, 53, 63 so that the first and second rotors 20, 30 rotate.

In another modification of the embodiment, for the torque conversion device 1, if the configuration illustrated in FIGS. 1 to 3 is assumed as one set, a plurality of sets may be coupled together. In this case, an input site and a torque extraction site are determined as appropriate.

The torque conversion device 1 according to the embodiment is also widely configurable as from a compact structure to a large structure.

The torque conversion device 1 according to the embodiment may also have an input side connected to an apparatus of small size and an output side (torque extraction side) connected to an apparatus of large size. In this case, for example, the torque conversion device 1 enables a large apparatus to be driven by input of a compact motor.

Although embodiments according to the present invention have been disclosed, it will be apparent by those skilled in the art that various changes may be made without departing from the scope of the present invention. All of such modifications and equivalents are intended to fall within the appended claims.

REFERENCE SIGNS LIST

1 . . . Torque conversion device
20 . . . First rotor
21 . . . First rotating shaft
30 . . . Second rotor
31 . . . Second rotating shaft
41b, 51b, 61b . . . First mounting portion
41c, 51c, 61c . . . Second mounting portion
43, 53, 63 . . . Weight

The invention claimed is:

1. A torque conversion device, comprising:
a first rotor;
a second rotor that has a rotating shaft disposed parallel to a rotating shaft of the first rotor;
at least one link portion that has a first mounting portion attached to the first rotor and a second mounting portion attached to the second rotor, the at least one link portion being interposed between the first rotor and the second rotor; and a weight that is attached to the at least one link portion and is disposed on any one of left and right sides of the first mounting portion;

wherein the at least one link portion has a distance between the first mounting portion and the second mounting portion equal to a distance between the rotating shaft of the first rotor and the rotating shaft of the second rotor, and has a distance between the rotating shaft of the first rotor and the first mounting portion equal to a distance between the rotating shaft of the second rotor and the second mounting portion, the first mounting portion is rotatably attached to at least one of the first rotor and the at least one link portion, and the second mounting portion is rotatably attached to at least one of the second rotor and the at least one link portion, and when any one of the first rotor and the second rotor rotates, the other of the first rotor and the second rotor rotates, and the rotating shaft of the first rotor and the rotating shaft of the second rotor also rotate, and also the at least one link portion and the weight move along a predetermined trajectory.

2. The torque conversion device according to claim 1, wherein the rotating shaft of the second rotor is disposed obliquely below the rotating shaft of the first rotor, and the weight is disposed on the same side of the rotating shaft of the first rotor as the rotating shaft of the second rotor in a left-right direction.

3. The torque conversion device according to claim 1, wherein the at least one link portion mounted with the weight includes a plurality of link portions, and the plurality of link portions has respectively the first mounting portions attached to the first rotor at regular intervals in a circumferential direction of the first rotor, and the plurality of link portions has respectively the second mounting portions attached to the second rotor at regular intervals in a circumferential direction of the second rotor.

4. The torque conversion device according to claim 1, wherein each of the first rotor and the second rotor has a disc shape and the corresponding rotating shaft is formed at a center of the disc shape.

5. The torque conversion device according to claim 2, wherein the at least one link portion mounted with the weight includes a plurality of link portions, and the plurality of link portions has respectively the first mounting portions attached to the first rotor at regular intervals in a circumferential direction of the first rotor, and the plurality of link portions has respectively the second mounting portions attached to the second rotor at regular intervals in a circumferential direction of the second rotor.

6. The torque conversion device according to claim 2, wherein each of the first rotor and the second rotor has a disc shape and the corresponding rotating shaft is formed at a center of the disc shape.

7. The torque conversion device according to claim 3, wherein each of the first rotor and the second rotor has a disc shape and the corresponding rotating shaft is formed at a center of the disc shape.

\* \* \* \* \*